US010594778B2

(12) United States Patent
Bergman et al.

(10) Patent No.: US 10,594,778 B2
(45) Date of Patent: *Mar. 17, 2020

(54) DATA PURGE DISTRIBUTION AND COHERENCY

(71) Applicant: Fastly Inc., San Francisco, CA (US)

(72) Inventors: Artur Bergman, San Francisco, CA (US); Tyler McMullen, San Francisco, CA (US)

(73) Assignee: Fastly Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/152,600

(22) Filed: Oct. 5, 2018

(65) Prior Publication Data

US 2019/0141116 A1 May 9, 2019

Related U.S. Application Data

(63) Continuation of application No. 15/465,337, filed on Mar. 21, 2017, now Pat. No. 10,116,734, which is a continuation of application No. 14/021,561, filed on Sep. 9, 2013, now Pat. No. 9,635,095.

(60) Provisional application No. 61/700,275, filed on Sep. 12, 2012.

(51) Int. Cl.
*H04L 29/08* (2006.01)

(52) U.S. Cl.
CPC .............. *H04L 67/10* (2013.01); *H04L 67/06* (2013.01); *H04L 67/2842* (2013.01); *H04L 67/2852* (2013.01); *H04L 67/1095* (2013.01)

(58) Field of Classification Search
CPC ........................... H04L 67/1095; H04L 67/06
See application file for complete search history.

(56) References Cited

U.S. PATENT DOCUMENTS

| 6,912,591 | B2 | 6/2005 | Lash | |
|---|---|---|---|---|
| 7,251,670 | B1 | 7/2007 | Day | |
| 7,797,376 | B1* | 9/2010 | Desai | H04L 67/2847 709/203 |
| 8,533,280 | B1 | 9/2013 | Clarke et al. | |
| 2002/0007402 | A1* | 1/2002 | Thomas Huston | G06F 16/9574 709/217 |
| 2007/0263671 | A1 | 11/2007 | Hu et al. | |
| 2010/0036949 | A1* | 2/2010 | Li | H04L 67/322 709/225 |
| 2010/0325363 | A1* | 12/2010 | Olesen | G06F 12/0815 711/135 |
| 2012/0124159 | A1* | 5/2012 | Takahashi | H04N 7/17318 709/213 |

(Continued)

*Primary Examiner* — Shean Tokuta
*Assistant Examiner* — Juan C Turriate Gastulo

(57) ABSTRACT

Systems, methods, and software for operating a content delivery system are provided herein. In one example, a method includes, in a first content delivery node, receiving a purge instruction to purge first content stored in the first content delivery node and responsively purging the first content. Responsive to purging the first content, the method includes transferring a content request for delivery to a second content delivery node, where the content request comprises a request for second content to replace the first content and a revision indicator of the first content. Responsive to the content request, the method includes receiving the second content for storage in the first content delivery node.

20 Claims, 5 Drawing Sheets

(56) References Cited

U.S. PATENT DOCUMENTS

2013/0166729 A1\* 6/2013 Gole .................. G06F 16/2358
709/224

\* cited by examiner

DATA PURGE DISTRIBUTION AND COHERENCY

RELATED APPLICATIONS

This application is a continuation of, and claims the benefit of priority to, U.S. patent application Ser. No. 15/465,337, filed Mar. 21, 2017, entitled "DATA PURGE DISTRIBUTION AND COHERENCY," which claims priority to U.S. patent application Ser. No. 14/021,561, filed on Sep. 9, 2013, entitled "DATA PURGE DISTRIBUTION AND COHERENCY," which itself claims the benefit of U.S. Provisional Application No. 61/700,275, filed on Sep. 12, 2012, and entitled "DATA PURGE DISTRIBUTION AND COHERENCY", both of which are hereby incorporated by reference in their entirety.

TECHNICAL FIELD

Aspects of the disclosure are related to the field of data storage systems, and in particular, handling of purge or change instructions for content in content delivery nodes of a content delivery system.

TECHNICAL BACKGROUND

Network-provided content, such as Internet web pages or media content such as video, pictures, music, and the like, are typically served to end users via networked computer systems. End user requests for the network content are processed and the content is responsively provided over various network links. These networked computer systems can include origin hosting servers which originally host network content of content creators or originators, such as web servers for hosting a news website. However, these computer systems of individual content creators can become overloaded and slow due to frequent requests of content by end users.

Content delivery systems have been developed which add a layer of caching between the origin servers of the content providers and the end users. The content delivery systems typically have one or more content delivery nodes distributed across a large geographic region to provide faster and lower latency access to the content for the end users. When end users request content, such as a web page, which is handled through a content delivery node, the content delivery node is configured to respond to the end user requests instead of the origin servers. In this manner, a content delivery node can act as a proxy for the origin servers.

Content of the origin servers can be cached into the content delivery nodes, and can be requested via the content delivery nodes from the origin servers of the content originators when the content has not yet been cached. Content delivery nodes usually cache only a portion of the original source content rather than caching all content or data associated with an original content source. The content delivery nodes can thus maintain only recently accessed and most popular content as cached from the original content sources. Thus, content delivery nodes exchange data with the original content sources when new or un-cached information is requested by the end users or if something has changed in the original content source data.

However, maintaining synchronized content across many content delivery nodes can be difficult. For example, adding new content or purging old content can become out of sync due to network latencies, network failures, node failures, or other events. Thus, end user devices can not receive proper or current content responsive to content requests when content delivery nodes contain content which is not properly synchronized or coherent.

OVERVIEW

Systems, methods, and software for operating a content delivery system are provided herein. In one example, a method includes, in a first content delivery node, receiving a purge instruction to purge first content stored in the first content delivery node and responsively purging the first content. Responsive to purging the first content, the method includes transferring a content request for delivery to a second content delivery node, where the content request comprises a request for second content to replace the first content and a revision indicator of the first content. Responsive to the content request, the method includes receiving the second content for storage in the first content delivery node.

In another example, one or more non-transitory computer readable media having stored thereon program instructions executable by one or more content delivery nodes is provided. When executed by the one or more content delivery nodes, the program instructions direct the one or more content delivery nodes to, in a first content delivery node, receive a purge instruction to purge first content stored in the first content delivery node and responsively purge the first content. Responsive to purging the first content, the program instructions direct the one or more content delivery nodes to, in the first content delivery node, transfer a content request for delivery to a second content delivery node, where the content request comprises a request for second content to replace the first content and a revision indicator of the first content. Responsive to the content request, the program instructions direct the one or more content delivery nodes to, in the first content delivery node, receive the second content for storage in the first content delivery node.

In another example, a content delivery system is provided. The content delivery system includes a first content delivery node configured to receive a purge instruction to purge first content stored in the first content delivery node and responsively purge the first content. Responsive to purging the first content, the first content delivery node is configured to transfer a content request for delivery to a second content delivery node, where the content request comprises a request for second content to replace the first content and a revision indicator of the first content. Responsive to the content request, the first content delivery node is configured to receive the second content for storage in the first content delivery node.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Network content, such as web page content, typically includes content such as text, hypertext markup language (HTML) pages, pictures, video, audio, code, scripts, or other content viewable by an end user in a browser or other application. This various network content can be stored and served by origin servers and equipment. The network content includes example website content referenced in FIG. 1, such as "www.gamma.gov," "www.alpha.com," and "www.beta.net," among others. In some examples, origin servers can serve the content to end user devices. However, when a content delivery system is employed, the content delivery system can act as a proxy to cache content delivery between origin servers and the end user devices.

Content delivery systems can add a layer of caching between origin servers of the content providers and the end users. The content delivery systems typically have one or more content delivery nodes distributed across a large geographic region to provide faster and lower latency local access to the content for the end users. When end users request content, such as a web page, a locally proximate content delivery node will respond to the content request instead of the associated origin server. Various techniques can be employed to ensure the content delivery node responds to content requests instead of the origin servers, such as associating web content of the origin servers with network addresses of the content delivery nodes instead of network addresses of the origin servers using domain name system (DNS) registration and lookup procedures.

Content management systems, end users, or other entities or systems can desire to delete, purge, or change content stored in content delivery nodes. These changes and purges are desired to be propagated quickly and coherently throughout a content delivery system which includes many content delivery nodes. Since each content delivery node can include a separate copy of the content, these purges or other changes can not be properly propagated under certain conditions, and content delivery nodes can inadvertently include mismatched revisions of the content. In the examples discussed herein, various system, methods, and software illustrate examples of proper coherency and propagation of the various content changes and purges in a content delivery system.

Figure 1:
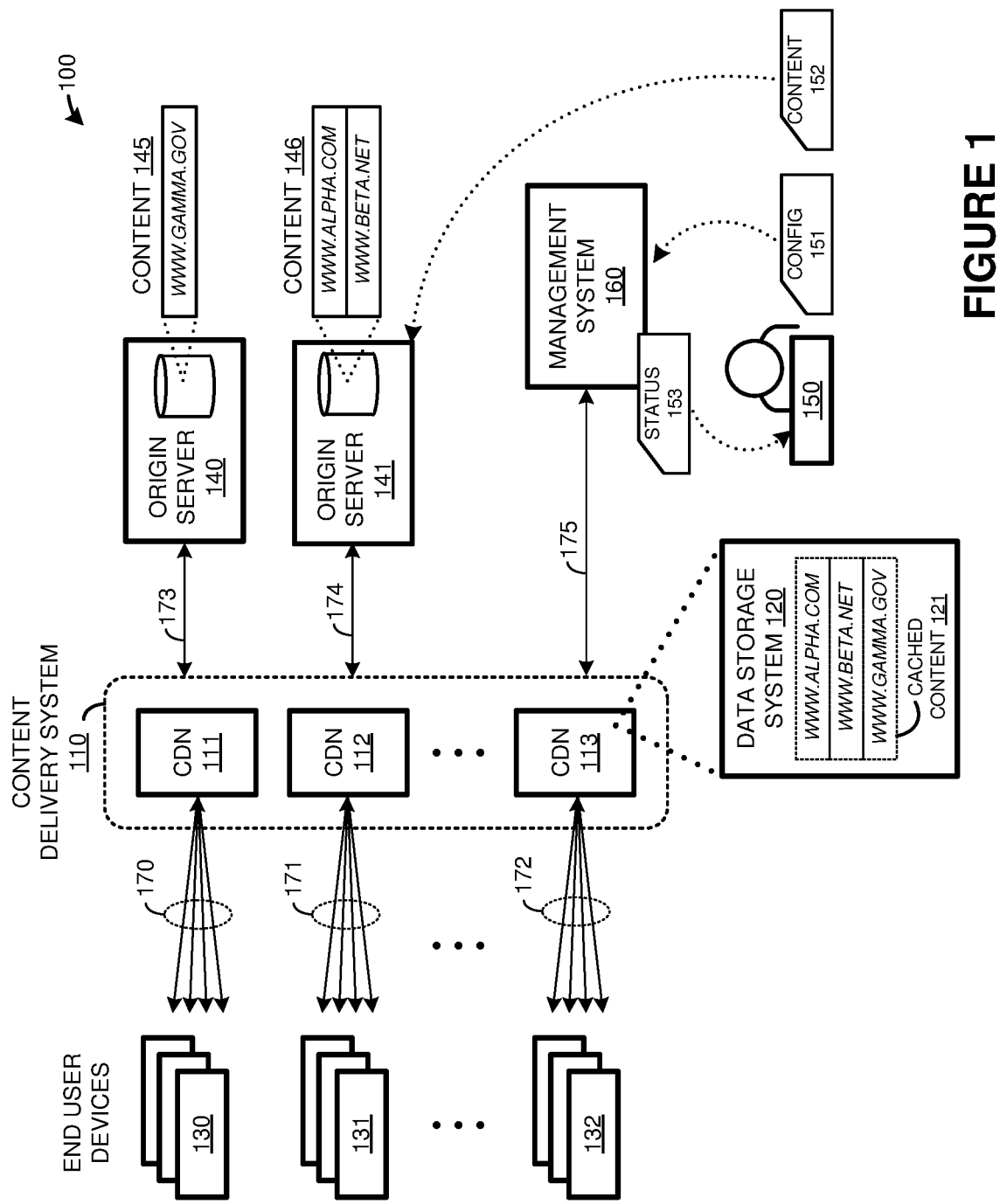
FIG. 1 is a system diagram illustrating a communication system according to an example.

As a first example employing a content delivery system, FIG. 1 is presented. FIG. 1 is a system diagram illustrating communication system 100. Communication system 100 includes content delivery system 110, end user devices 130-132, origin servers 140-141, and management system 160. Content delivery system 110 includes one or more content delivery nodes (CDN) 111-113. Each of CDN 111-113 can include one or more data storage systems, such as that illustrated for CDN 113 as data storage system 120. End user devices 130-132 are representative of a plurality of end user devices which can request and receive network content, and any number of end user devices 130-132 can be associated with each of content delivery nodes 111-113. CDN 111-113 and ones of end users 130-132 communicate over associated network links 170-172. Content delivery system 110 and origin servers 140-141 communicate over associated network links 173-174. Content delivery system 110 and management system 160 communicate over link 175. Although not shown in FIG. 1 for clarity, each of CDN 111-113 can also communicate with each other over network links.

To further illustrate FIG. 1, a brief description of the operation of communication system 100 is included. In operation, end user devices 130-132 request network content, such as content 145-146 associated with origin servers 140-141. Instead of these requests being handled by the individual origin servers 140-141, individual content delivery nodes 111-113 of content delivery system 110 receive the content requests over ones of links 170-172 and processes the content requests for delivery of the content to the associated end user devices 130-132. Requested network content that is already stored in ones of CDN 111-113 can be provided quickly to the end user devices, while network content that is not already stored in ones of CDN 111-113 can be responsively requested by an associated one of CDN 111-113 from an appropriate origin server 140-141 for delivery by the CDN and possible caching by the CDN. In this manner, each of CDN 111-113 can act as intermediary proxy nodes to provide local and fast access for end user devices 130-132 to network content of origin servers 140-141 without burdening origin servers 140-141. FIG. 1 shows cached content 121 included in data storage system 120 of CDN 113 as comprised of content 145-146, and thus content 145-146 is currently shown as cached by CDN 113. Other configurations are possible, including subsets of content 145-146 being cached in individual ones of CDN 111-113.

Although FIG. 1 shows content 145-146 of origin servers 140-141 being cached by data storage system 120, other content can be handled by CDN 111-113. For example, dynamic content generated by activities of end user devices 130-132 need not originally reside on origin servers 140-141, and can be generated due to scripting or code included in web page content delivered by CDN 111-113. This dynamic content can also be cached by ones of CDN 111-113, and can be specific to a particular end user device during a communication session.

Management system 160 handles configuration changes and status information collection and delivery for system operators and for the origin server operators or managers. For example, operator device 150 can transfer configuration 151 for delivery to management system 160, where configuration 151 can alter the handling of network content requests by CDN 111-113, among other operations. Also, management system 160 can monitor status information for the operation of CDN 111-113, such as operational statistics, and provide this status information as 153 to operator device 150.

Furthermore, operator device 150 can transfer content 152 for delivery to origin servers 140-141 to include in content 145-146. Operator device 150, or other devices, can also transfer content change instructions or content purge instructions to management system 160 to change or purge content stored in CDN 111-113. Although one operator device 150 is shown in FIG. 1, it should be understood that this is merely representative and communication system 100 can include many operator devices for receiving status information, providing configuration information, or transferring content to origin servers.

Figure 2:
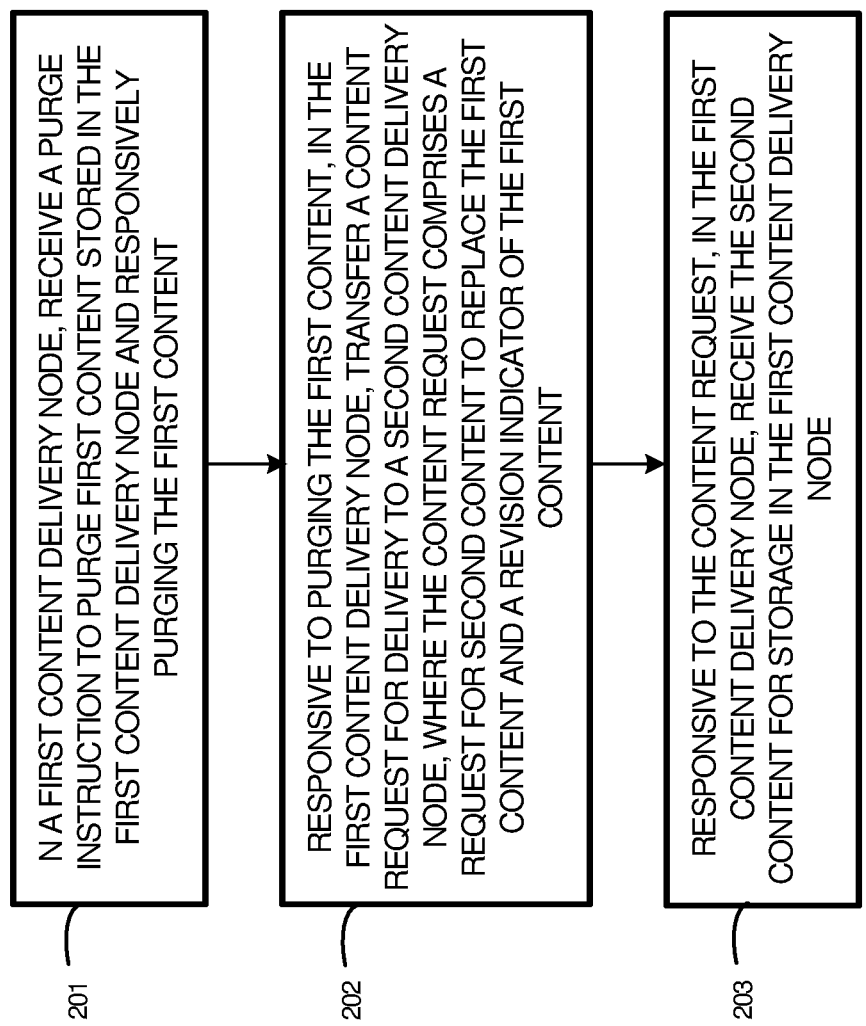
FIG. 2 is a diagram illustrating a method of operation of a content delivery system.

FIG. 2 illustrates a flow diagram which describes an example method of operation of a content delivery system, such as for content delivery system 110 of FIG. 1 to purge content and retrieve replacement content for the purged content. The operations of FIG. 2 are referenced parenthetically in the description below.

In FIG. 2, a first content delivery node receives (201) a purge instruction to purge first content stored in the first content delivery node and responsively purges the first content. In this example, the first content delivery node is CDN 113, although any CDN can be employed. The purge instruction can be received from any of operator device 150, end user devices 130-132, management system 160, origin servers 140-141, or any other device which can issue purge instructions for content. The first content can comprise a web page, URL, or an entire web site, among other data portions, including any content associated therewith, such as pictures, video, audio, dynamic code, static code, text, or other content.

Responsive to purging the first content, content delivery node 113 transfers (202) a content request for delivery to another or second content delivery node, where the content request comprises a request for second content to replace the first content and a revision indicator of the first content. The content request can identify the second content via an indicator associated with the first content, such as a URL, website indicator, data address, filename, or other data identifier. In some examples, the revision indicator is a numerical indicator of content revision or version, such as a timestamp, serially incrementing number or indicator, hashed indicator, date, or other revision indicator.

Responsive to the content request, content delivery node 113 receives (203) the second content for storage in the first content delivery node. Second content is to replace first content, such as when second content is a later revision and desired to replace first content which is an earlier revision. Content delivery node 113 stores the second data in a data storage system, such as data storage system 120.

In some examples, the other content delivery node can include CDN 111 or 112, among other CDNs, or can include origin servers 140-141. When the 'other' or 'second' content delivery node discussed in FIG. 2 is one of CDN 111-112, then these CDNs can be referred to as shield nodes or watcher nodes. These shield nodes act as a layer of caching or storage between CDN 113 and origin servers 140-141.

In further examples, the second content delivery node, such as CDN 111-112, receive the content request transferred by CDN 113. When the revision indicator of the first content indicates an earlier revision than third content stored in the second content delivery node, then the second content delivery node transfers the third content as the second content for delivery to CDN 113. When the revision indicator of the first content indicates a same revision or a later revision as the third content stored in the second content delivery node, then the second content delivery node requests fourth data from a data node and transfers fourth data as the second data for delivery to the first content delivery node. The data node can include origin servers 140-141, or can include another CDN, including combinations thereof.

Figure 3:
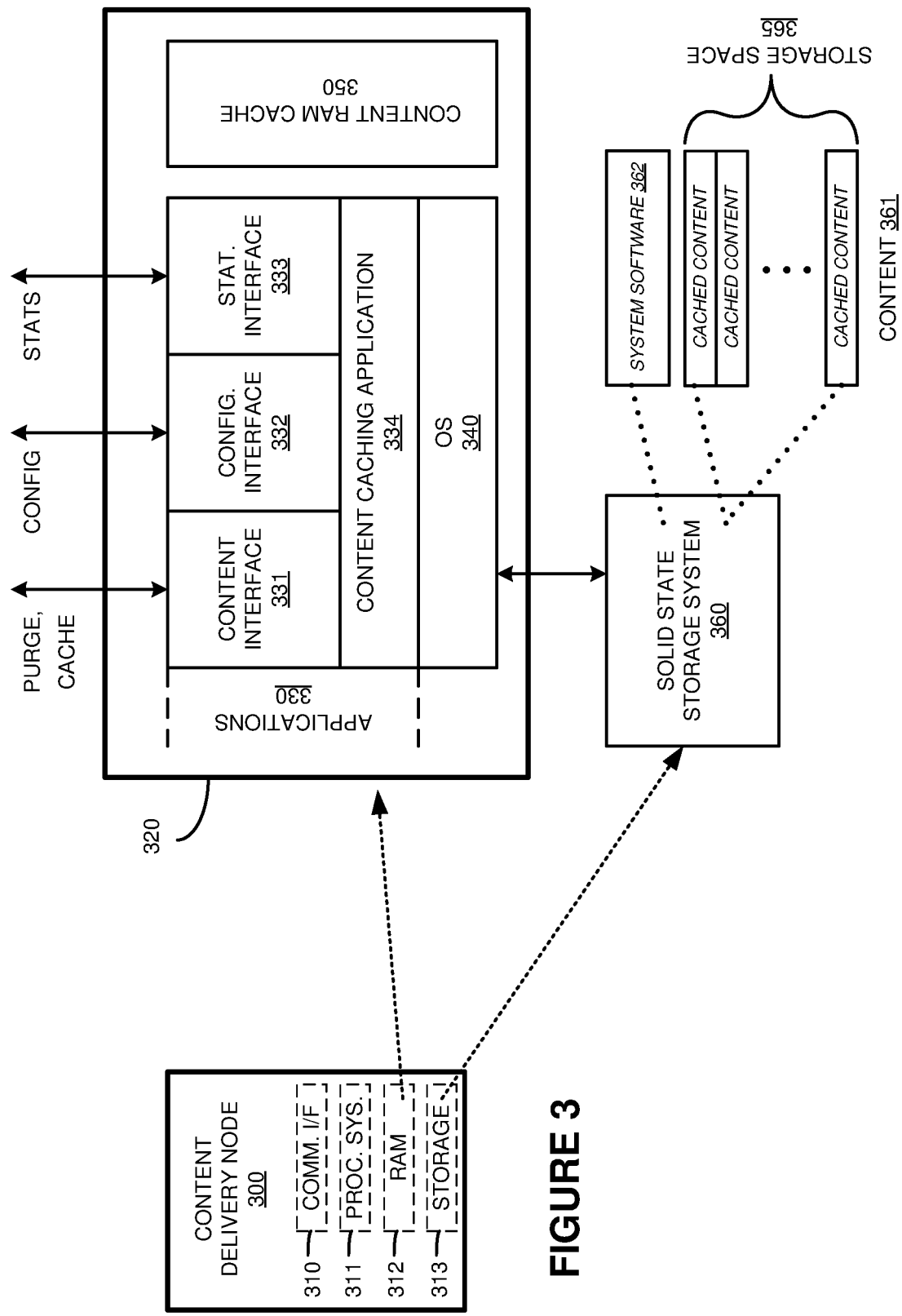
FIG. 3 is a block diagram illustrating a content delivery node.

To further describe the operation of individual ones of CDN 111-113 of FIG. 1, FIG. 3 is provided which illustrates content delivery node (CDN) 300. It should be understood that CDN 111-113 can each use other configurations, and CDN 300 is merely one example. CDN 300 includes communication interface 310, processing system 311, random access memory (RAM) 312, and storage 313. Example contents of RAM 312 are further detailed in RAM space 320, and example contents of storage 313 are further detailed in solid state storage system 360.

In operation, processing system 311 is operatively linked to communication interface 310, RAM 312, and storage 313. Processing system 311 is capable of executing software stored in RAM 312 or storage 313. When executing the software, processing system 311 drives CDN 300 to operate as described herein. CDN 300 can also include other elements, such as user interfaces, computer systems, databases, distributed storage and processing elements, and the like.

Processing system 311 can be implemented within a single processing device but can also be distributed across multiple processing devices or sub-systems that cooperate in executing program instructions. Examples of processing system 311 include general purpose central processing units, microprocessors, application specific processors, and logic devices, as well as any other type of processing device.

Communication interface 310 includes one or more network interfaces for communicating over communication networks, such as packet networks, the Internet, and the like. The network interfaces can include one or more local or wide area network communication interfaces which can communicate over Ethernet or Internet protocol (IP) links. Examples of communication interface 310 include network interface card equipment, transceivers, modems, and other communication circuitry.

RAM 312 and storage 313 together can comprise a data storage system, such as that illustrated in data storage system 120 in FIG. 1, although variations are possible. RAM 312 and storage 313 can each comprise any storage media readable by processing system 311 and capable of storing software. RAM 312 can include volatile and nonvolatile, removable and non-removable media implemented in any method or technology for storage of information, such as computer readable instructions, data structures, program modules, or other data. Storage 313 can include non-volatile storage media, such as solid state storage media, flash memory, or as illustrated by solid state storage system 360 in this example. RAM 312 and storage 313 can each be implemented as a single storage device but can also be implemented across multiple storage devices or sub-systems. RAM 312 and storage 313 can each comprise additional elements, such as controllers, capable of communicating with processing system 311. In some implementations, the storage media can be a non-transitory storage media. In some implementations, at least a portion of the storage media can be transitory. It should be understood that in no case are the storage media propagated signals.

Software stored on or in RAM 312 or storage 313 can comprise computer program instructions, firmware, or some other form of machine-readable processing instructions having processes that when executed by processing system 311 direct CDN 300 to operate as described herein. For example, software drives CDN 300 to process an erase operation for a storage space to identify first content to be erased from the storage space, identify the first content as being associated with first data contained in a first storage segment, process at least the first storage segment to identify at least second data associated with second content contained in the first storage segment, and erase the first storage segment by erasing at least the first data and the second data, among other operations. The software can also include user software applications. The software can be implemented as a single application or as multiple applications. In general, the software can, when loaded into processing system 311 and executed, transform processing system 311 from a general-purpose device into a special-purpose device customized as described herein.

RAM space 320 illustrates a detailed view of an example configuration of RAM 312. It should be understood that different configurations are possible. RAM space 320 includes applications 330, operating system (OS) 340, and content RAM cache 350. Content RAM cache 350 includes RAM space for temporary storage of content received over content interface 331, such as dynamic random access memory (DRAM).

Applications 330 include content interface 331, configuration interface 332, statistics interface 333, and content caching application 334. Content caching application 334 handles caching of content and management of storage spaces, such as content RAM cache 350 and storage space 365, as well as exchanges content, data, and instructions via content interface 331, configuration interface 332, and statistics interface 333. Content caching application 334 can comprise a custom application, Varnish caching software, hypertext transfer protocol (HTTP) accelerator software, or other content caching and storage applications, including variation, modifications, and improvements thereof. Applications 330 and OS 340 can reside in RAM space 320 during execution and operation of CDN 300, and can reside in system software storage space 362 on solid state storage system 360 during a powered-off state, among other locations and states. Applications 330 and OS 340 can be loaded into RAM space 320 during a startup or boot procedure as described for computer operating systems and applications.

Content interface 331, configuration interface 332, and statistics interface 333 each allow a user to interact with and exchange data with content caching application 334. In some examples, each of content interface 331, configuration interface 332, and statistics interface 333 comprise an application programming interface (API). Content interface 331 allows for exchanging content for caching in CDN 300 by content caching application 334, and can also receive instructions to purge or erase data from CDN 300. Configuration interface 332 allows for altering the configuration of various operational features of content caching application 334. In some examples, configuration interface 332 comprises a scripting language interface, such as Varnish Configuration Language (VCL), Perl, PHP, Javascript, or other scripting or interpreted language-based interfaces. Statistics interface 333 allows for exchange of statistical information related to the operation of CDN 300, such as cache hits/misses, cache fullness information, cache performance statistics, timing statistics, history metrics, among other statistical information. Content interface 331, configuration interface 332, and statistics interface 333 each can communicate with external systems via communication interface 310 over any associated network links.

Figure 4:
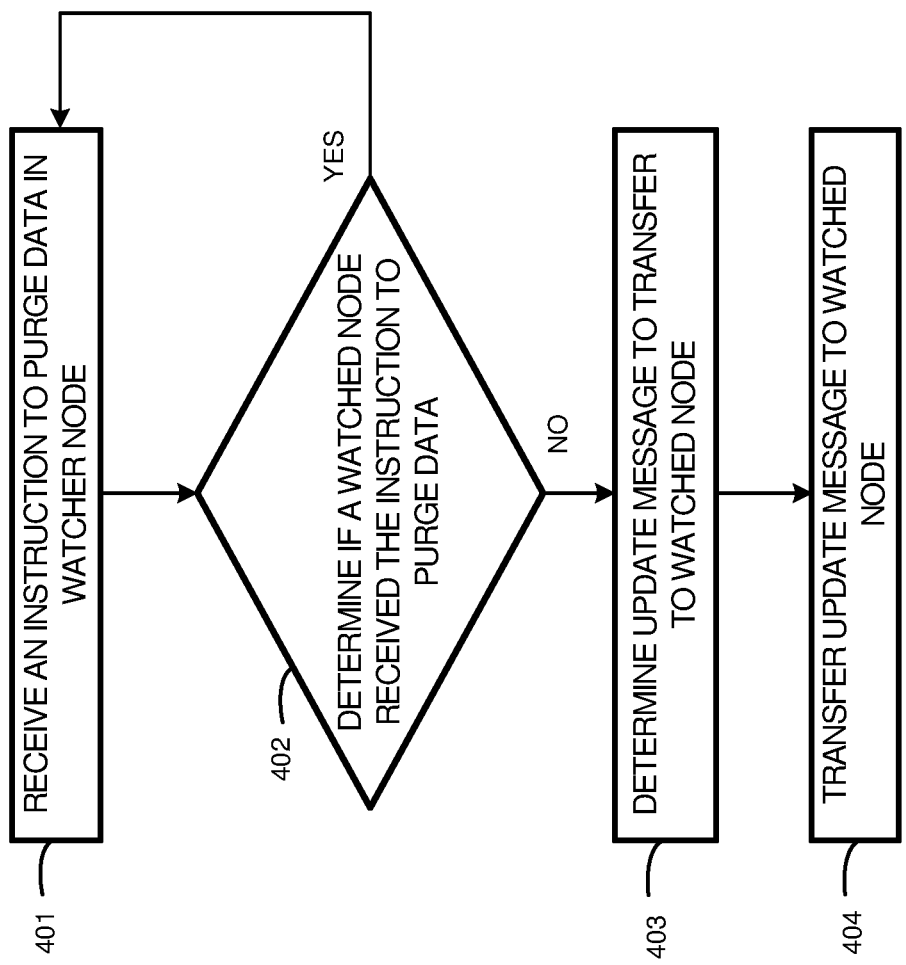
FIG. 4 is a diagram illustrating a method of operation of a content delivery system.

Solid state storage system 360 illustrates a detailed view of an example configuration of storage 313, and in some examples storage space 365 comprises the storage space as described in FIG. 2 or storage space 420 in FIG. 4. Solid state storage system 360 can comprise flash memory such as NAND flash or NOR flash memory, among other solid state storage technologies. As shown in FIG. 3, solid state storage system 360 includes system software 362, as well as content 361 stored in storage space 365. As described above, system software 362 can be a non-volatile storage space for applications 330 and OS 340 during a powered-down state of CDN 300, among other operating software. Content 361 includes cached content, such as the web content examples in FIG. 1, which can include text, data, pictures, video, audio, web pages, scripting, code, dynamic content, or other network content.

It should be understood that content delivery node 300 is generally intended to represent a computing system with which at least software 330 and 340 are deployed and executed in order to render or otherwise implement the operations described herein. However, content delivery node 300 can also represent any computing system on which at least software 330 and 340 can be staged and from where software 330 and 340 can be distributed, transported, downloaded, or otherwise provided to yet another computing system for deployment and execution, or yet additional distribution.

FIG. 4 is a flow diagram illustrating a method of operation of a content delivery system to distribute purge messages or purge instructions among content delivery nodes. The operations of FIG. 4 can describe operation for CDN 111-113 of content delivery system 110 in FIG. 1 or CDN 300 in FIG. 4, or other content delivery nodes or systems discussed herein.

When many content delivery nodes are employed in a content delivery system, ones of the content delivery nodes can be configured to act as watcher nodes to watch or monitor the purging operations of other ones of the content delivery nodes. Watcher nodes can be watched nodes, and vice-versa, in many examples. These watcher nodes can periodically poll the watched nodes to determine which purge instructions have been received. Alternatively, the watcher nodes can periodically distribute any purge instructions that have been received within a certain time period or since the last purge instruction distribution time to the watched nodes. When watched nodes receive purge instructions from a watcher node, the purge instructions received from a watcher node into a watched node can be compared against already received purge instructions to determine if the purge instruction must be executed or can be ignored as already executed. Each purge instruction can include an identifier, such as a purge identifier, timestamp, hashed number, serial number, or other identifier used to discriminate among purge instructions.

In further examples, a watcher node can periodically poll a watched node to ensure the watched node is still operational, and has not halted or crashed operation. If the watched node is responsive to the poll, then the watcher node can assume that all purge instructions have been received and executed by the operational watched node. However, if the watched node does not respond to the poll by the watcher node, then the watcher node can wait until the watched node is operational and transfer any purge instructions to the watched node which were received by the watcher node since the last successful poll of the watched node. This way ensures that a watched node receives all purge instructions and if the watched node cases operation, such as during an unintentional power outage or crash, then the missed purge instructions can be distributed by the watcher node.

In FIG. 4, a content delivery system receives (401) an instruction to purge content from content delivery nodes. The purge instruction can be received from any of operator device 150, end user devices 130-132, management system 160, origin servers 140-141, or any other device which can issue purge instructions for content. The purge instruction can be received by any content delivery node, such as by CDN 111-113 or CDN 300.

After the purge instruction is received, a content delivery node such as a watcher node can determine (402) if a particular watched content delivery node received the purge instruction. This can be accomplished by polling the watched node for recently received messages, requesting recently received purge requests from the watched node, requesting recent content, or any other method of determining is the watched node had received the purge request, such as discussed above. This operation can also be accomplished if the watched node was inoperative or otherwise not responsive.

If it is determined that the watched node has indeed received the request, then operation 401 is returned to await another purge instruction. If it is determined that the watched node had not received the purge instruction, the watcher node determines (403) an update message to be sent to the watched node. This update message to be sent can be determined from the information received when determining if the watched node had received the request. This can include resending purge instructions received at the watcher node that can or can not have been received by the watched node. The update message to be sent can also include newer content than received from the watched node when requested to determine if the watched node had received the message, among many other data to be included in the message to be sent. The update message can include content retrieved from the watcher node responsive to a purge instruction or purge message, such as content to replace the data purged responsive to the purge instruction. Once the update message to be sent is determined, the update message is transferred (404) from the watcher node to the watched node.

In another example, there can be more than one watcher node. The watcher node(s) can poll the more than one watcher nodes to determine if the watcher nodes had received the most recent purge instructions(s). This determination can include checking a time stamp or other identifier of the purge instructions for the more than one watched nodes, taking the most common requests from the watched nodes, or any other method of determining if the watched node has received the correct requests.

The watched nodes can be configured to request content, data, purge requests, and the like from the watcher or shield nodes before requesting the content and the like from an associated origin server, such as origin servers 140-141. These various methods can increase data integrity and availability of the content delivery system.

Each watcher or shield node can keep a list or record of watched nodes. If any of the watched nodes are unresponsive, the watcher node can keep the most recent purge instructions and periodically determine if the watched node(s) are back on-line. Once the watched node is responsive and running the most recent purge requests are sent to the watched node.

In an example operation, a watcher content delivery node A receives a purge instruction, then transfers it to watched content delivery nodes B, C and D. Content delivery node D is unresponsive during the transfer, and thus misses the purge instruction, but node D comes back online later. After coming back online, node D receives an update message from node A comprising the missed purge instruction.

Figure 5:
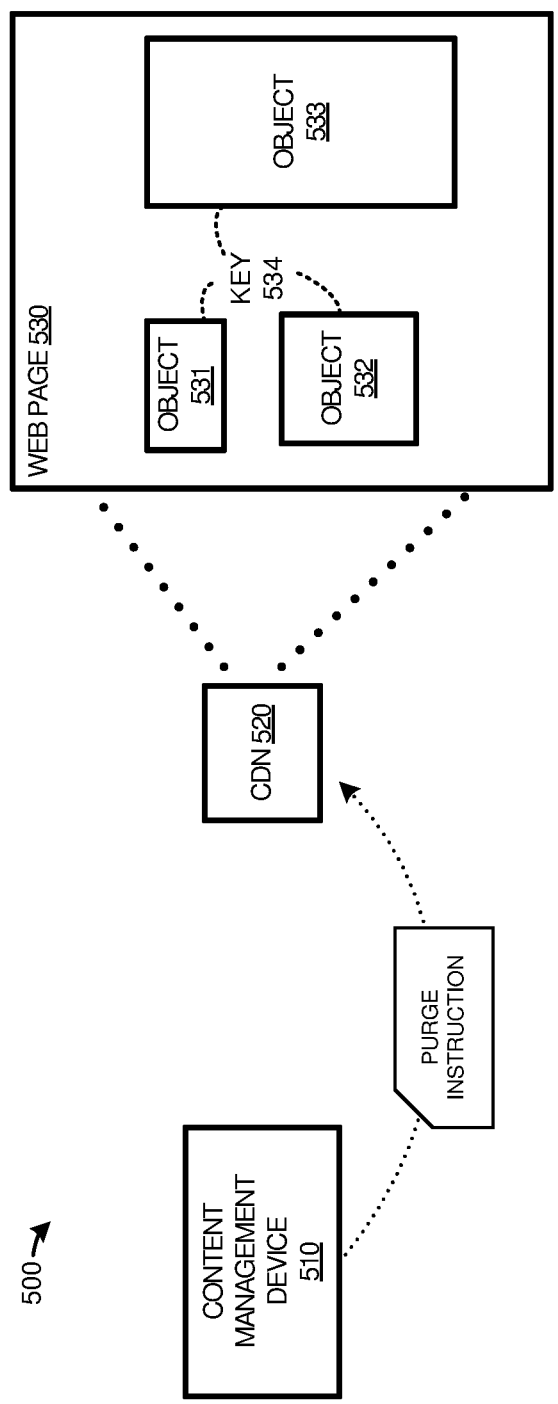
FIG. 5 is a diagram illustrating a communication system according to an example.

FIG. 5 is a diagram illustrating communication system 500 according to an example. FIG. 5 can be an illustration showing the operation of keyed purging. Content management device 510 sends a purge instruction for receipt by CDN 520. The purge instruction can be to purge particular content from CDN 520, such as to purge webpage content 530. However, web pages can include several pieces of content, such as pictures, video, text, dynamic code, and the like. Each piece of content can be referenced by a separate URL or other address or indicator. In FIG. 5, web page 530 includes objects 531-533 which can comprise pictures, video, text, dynamic code, and the like. When objects 531-533 are indicated with a property or otherwise marked as associated with a particular content key. This content key, such as that indicated by key 534 in FIG. 5, associates together any content marked with the content key, even if the content is of different types or associated with different URLs. The keys or tags can be associated with entire web pages, or sub-portions of a web page, as indicated in FIG. 5.

When a purge instruction is received which indicates a content key, then any content associated with the content key can be purged, such as by erasure or deletion from a particular content delivery node. The content key can include any mark, tag, indicator, and the like. In some examples, the content key is included in a HTML code header or HTML tag, such as <content_key: "front_page"> which can indicate content associated with a 'front page' of a particular website. Other purging identifiers can be employed other than the keyed identification. For example, content can be identified by URL, filename, or all content associated with a particular website can be purged. However, the keyed purging allows selective purging of content elements that are previously associated with the content key, and thus can purge portions of content or web pages which vary in size and quantity.

Content management device 510 can comprise operator device 150, end user devices 130-132, management system 160, origin servers 140-141, or any other device which can issue purge instructions for content. CDN 520 can comprise CDNs 111-113 or CDN 300, among other content delivery nodes or systems. Webpage 530 is an example, and any collection of objects or data associated with content which can be keyed as discussed herein for purging.

Referring back to FIG. 1, CDN 111-113, origin servers 140-141, and management system 160 can each include communication interfaces, network interfaces, processing systems, computer systems, microprocessors, storage systems, storage media, or some other processing devices or software systems, and can be distributed among multiple devices. Examples of CDN 111-113, origin servers 140-141, and management system 160 can each include software such as an operating system, logs, databases, utilities, drivers, caching software, networking software, and other software stored on a computer-readable medium. Content delivery system 110, in addition to including CDN 111-113, can include equipment and links to route communications between CDN 111-113 and any of end user devices 130-132, origin servers 140-141, and management system 160, among other operations.

End user devices 130-132 can each be a user device, subscriber equipment, customer equipment, access terminal, smartphone, personal digital assistant (PDA), computer, tablet computing device, e-book, Internet appliance, media player, game console, or some other user communication apparatus, including combinations thereof.

Communication links 170-175 each use metal, glass, optical, air, space, or some other material as the transport media. Communication links 170-175 can each use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication links 170-175 can each be a direct link or can include intermediate networks, systems, or devices, and can include a logical network link transported over multiple physical links.

Although one main link for each of links 170-175 is shown in FIG. 1, it should be understood that links 170-175 are merely illustrative to show communication modes or access pathways. In other examples, further links can be shown, with portions of the further links shared and used for different communication sessions or different content types, among other configurations. Communication links 170-175 can each include many different signals sharing the same associated link, as represented by the associated lines in FIG. 1, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a content delivery network, the method comprising:
   purging first content at a first cache node based on receiving a purge instruction to purge the first content;
   after purging the first content, sending a first content request from the first cache node to a second cache node, including a request for second content to replace the first content and a revision indicator of the first content;
   receiving the second content for storage in the first cache node based on the first content request;
   receiving a second content request at the first cache node from a third cache node, including a second revision indicator for content purged from the third cache node;
   when the second revision indicator indicates an earlier revision than third content stored in the first cache node, sending the third content to the third cache node;
   when the second revision indicator indicates a same revision or a later revision than the third content stored in the first cache node:
     sending a request for fourth data from the first cache node to another node; and
     sending the fourth data to the third cache node in response to the second content request.

2. The method of claim 1, further comprising:
   in the second cache node, receiving the first content request;
   when the revision indicator of the first content indicates an earlier revision than corresponding content stored in the second cache node, then sending the corresponding content as the second content to the first cache node;
   when the revision indicator of the first content indicates a same revision or a later revision as the corresponding content in the second cache node;
     requesting newer data be sent from a data node to the second cache node, and
     sending the newer data as the second data to the first cache node.

3. The method of claim 1, wherein the second content is of a later revision than the first content.

4. The method of claim 1, wherein the revision indicator comprises a timestamp.

5. The method of claim 1, further comprising:
   in the first cache node, determining if a fourth cache node received the purge instruction to purge the first content; and
   when the fourth cache node has not received the purge instruction sending an update message comprising the purge instruction from the first cache node to the fourth cache node.

6. The method of claim 5, wherein the update message further comprises the second content to replace the first content in the fourth cache node.

7. The method of claim 1, wherein the purge instruction comprises a content key; and wherein purging the first content comprises only purging portions of the first content which have been marked with the content key.

8. One or more data storage media storing program instructions that, when executed, direct one or more cache nodes to:
   purge first content from a first cache node based on receiving a purge instruction for the first content at the first cache node;
   after purging the first content, send a first content request from the first cache node to a second cache node, including a request for second content to replace the first content and a revision indicator of the first content;
   receive the second content for storage in the first cache node from the second cache node;
   receive a second content request at the first cache node from a third cache node, including a second revision indicator for content purged from the third cache node;
   when the second revision indicator indicates an earlier revision than third content stored in the first cache node, send the third content to the third cache node;
   when the second revision indicator indicates a same revision or a later revision than the third content stored in the first cache node:
     send a request for fourth data from the first cache node to another node;
     receive the fourth data at the first cache node; and
     send the fourth data to the third cache node in response to the second content request.

9. The one or more data storage media of claim 8, storing further instructions that, when executed, direct the one or more cache nodes to:
   receive the first content request at the second cache node;
   when the revision indicator of the first content indicates an earlier revision corresponding content stored in the second cache node, sending the corresponding content to the first cache node as the second content;
   when the revision indicator of the first content indicates a same revision or a later revision as the corresponding content stored in the second cache node;
     request a newer version of the corresponding data be sent from a data node to the second cache node; and
     sending the newer version of the corresponding data as the second data to the first cache node.

10. The one or more data storage media of claim 8, wherein the second content is of a later revision than the first content.

11. The one or more data storage media of claim 8, wherein the revision indicator comprises a timestamp.

12. The one or more data storage media of claim 8, storing further instructions that, when executed, direct the one or more cache nodes to:
  in the first cache node, determine if a fourth cache node received the purge instruction to purge the first content; and
  when the fourth cache node has not received the purge instruction, send an update message comprising the purge instruction from the first cache node to the fourth cache node.

13. The one or more data storage media of claim 12, wherein the update message further comprises the second content to replace the first content in the fourth cache node.

14. The one or more data storage media of claim 8, storing further instructions that, when executed, direct the one or more cache nodes to:
  receive, at the first cache node, the purge instruction including a content key identifying portions of the first content to purge; and
  purge only the portions of the first content identified by the content key.

15. A content delivery network, comprising:
  a first cache node configured to:
    purge first content from the first cache node in response to receiving a purge instruction;
    after purging the first content, send a first content request to a second cache node, including a request for second content to replace the first content and a revision indicator of the first content;
    receive the second content for storage in the first cache node based on the first content request;
    receive a second content request at the first cache node from a third cache node, including a second revision indicator for content purged from the third cache node;
    when the second revision indicator indicates an earlier revision than third content stored in the first cache node, send the third content to the third cache node;
    when the second revision indicator indicates a same revision or a later revision than the third content stored in the first cache node:
      send a request for fourth data to another node; and
      send the fourth data to the third cache node in response to the second content request.

16. The content delivery network of claim 15, comprising: the second cache node configured to:
  receive the first content request;
  when the revision indicator of the first content indicates an earlier revision than corresponding content stored in the second cache node, send the corresponding content as the second content to the first cache node;
  when the revision indicator of the first content indicates a same revision or a later revision as the corresponding content stored in the second cache node;
    request data with a newer revision than the first content be sent to the second cache node from a data node; and
    send the data with the newer revision as the second data to the first cache node.

17. The content delivery network of claim 15, wherein the second content is of a later revision than the first content.

18. The content delivery network of claim 15, wherein the revision indicator comprises a timestamp.

19. The content delivery network of claim 15, comprising the first cache node further configured to:0
  determine if a fourth cache node received the purge instruction to purge the first content; and
  when the fourth cache node has not received the purge instruction, send an update message comprising the purge instruction for delivery to the fourth cache node.

20. The content delivery network of claim 15, comprising: the first cache node configured to purge only portions of the first content corresponding to a content key, wherein the purge instruction includes the content key.

* * * * *